Oct. 5, 1948.    R. C. HANSFORD ET AL    2,450,658
PRODUCTION OF THIOPHENE
Filed Sept. 28, 1944    3 Sheets-Sheet 3

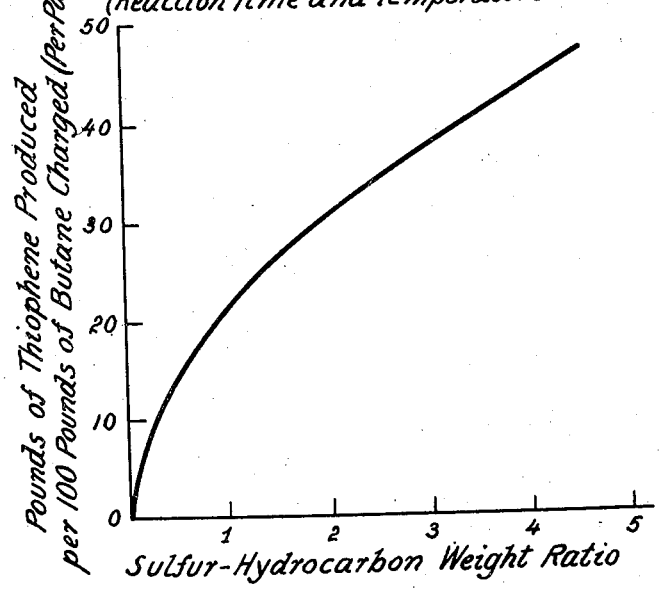
Fig. 1. SINGLE PASS THIOPHENE PRODUCTION AS A FUNCTION OF PROPORTION OF SULFUR CHARGED (Reaction Time and Temperature held Constant)
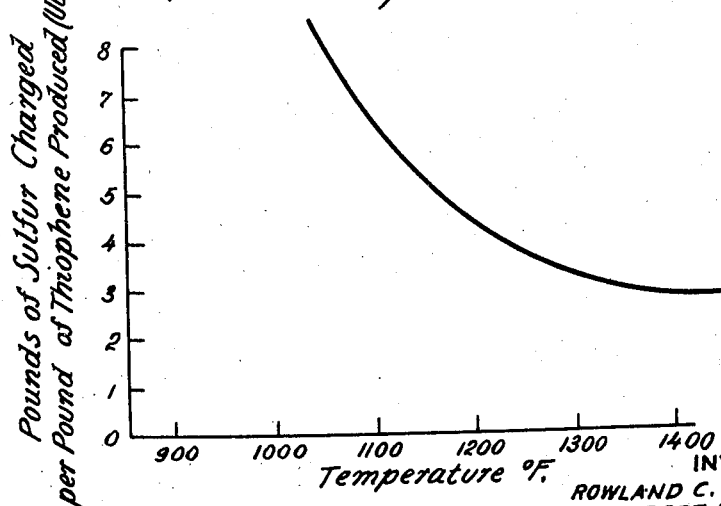
Fig. 2. SULFUR THROUGH-PUT AS A FUNCTION OF TEMPERATURE (Reaction Time and Sulfur-Hydrocarbon Ratio held Constant)
INVENTORS
ROWLAND C. HANSFORD,
HERBERT E. RASMUSSEN,
CLAUDE G. MYERS,
and ALEXANDER N. SACHANEN.
BY
ATTORNEY

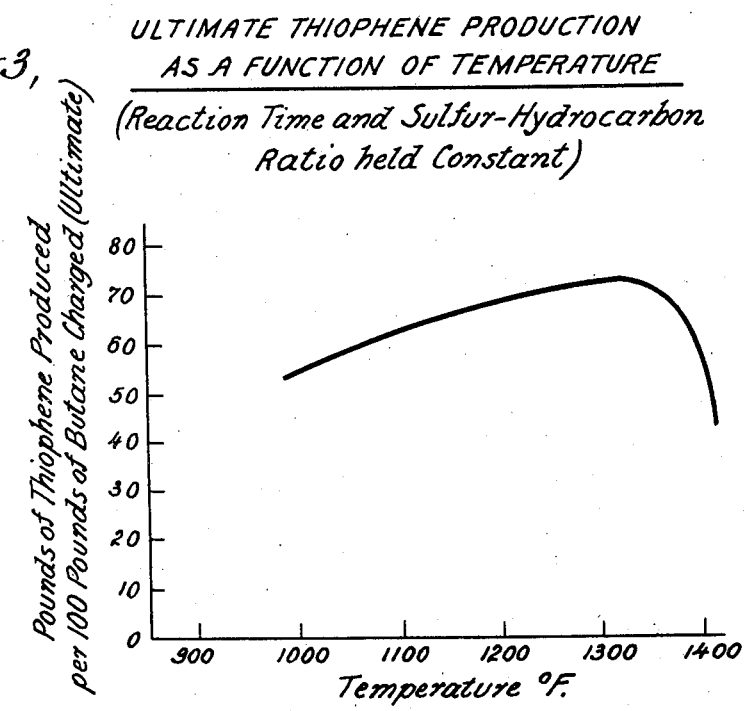
Fig. 3. ULTIMATE THIOPHENE PRODUCTION AS A FUNCTION OF TEMPERATURE (Reaction Time and Sulfur-Hydrocarbon Ratio held Constant)
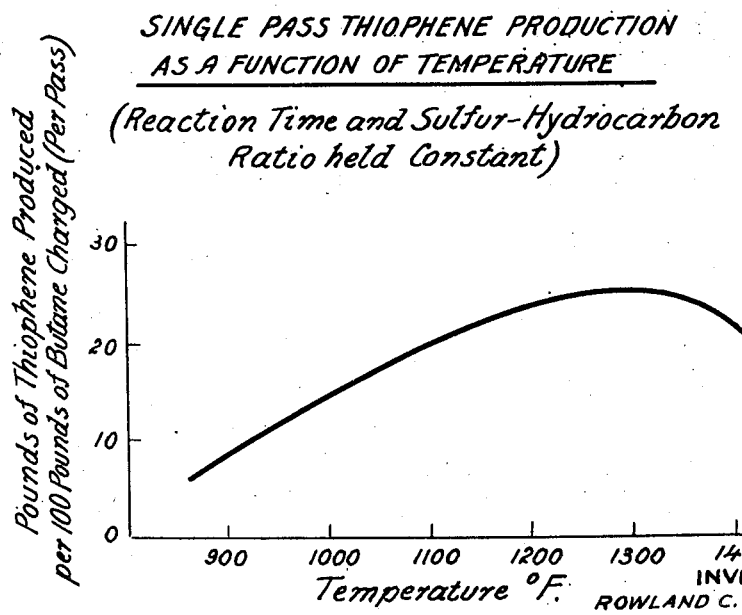
Fig. 4. SINGLE PASS THIOPHENE PRODUCTION AS A FUNCTION OF TEMPERATURE (Reaction Time and Sulfur-Hydrocarbon Ratio held Constant)

Fig. 5.

INVENTORS
ROWLAND C. HANSFORD,
HERBERT E. RASMUSSEN,
CLAUDE G. MYERS,
and ALEXANDER N. SACHANEN.

ATTORNEY

Patented Oct. 5, 1948

2,450,658

UNITED STATES PATENT OFFICE 2,450,658

PRODUCTION OF THIOPHENE

Rowland C. Hansford and Herbert E. Rasmussen, Woodbury, N. J., and Claude G. Myers, Bryn Mawr, Pa., and Alexander N. Sachanen, Woodbury, N. J., assignors to Socony-Vacuum Oil Company, Incorporated, a corporation of New York Application September 28, 1944, Serial No. 556,150

20 Claims. (Cl. 260—329)

This invention relates to the manufacture of thiophene, and is more particularly concerned with a process for producing thiophene from normal aliphatic hydrocarbons containing four carbon atoms.

Thiophene is a well known compound and occurs, ordinarily, in the benzene fraction of coal tar distillates. The amounts of thiophene usually present in the crude benzene fraction, are of the order of about 0.5%. The close proximity of the boiling points of thiophene and benzene renders the complete separation and recovery of thiophene from the benzene fraction, by fractional distillation, a somewhat difficult operation. Consequently, commercial benzene normally contains traces of thiophene. However, since thiophene is amenable to sulfonation much more readily than benzene, thiophene can be removed from benzene in the form of its sulfonate, by repeated treatments with concentrated sulfuric acid. This, of course, is an expensive operation.

Thiophene has been synthesized in a number of ways. In accordance with the syntheses of the prior art, acetylene has constituted a preferred source of thiophene. Thus, it has been proposed to produce thiophene by reacting acetylene with pyrites, with hydrogen sulfide in the presence of catalytic material, with sulfur in the presence or absence of catalytic material, and with carbon disulfide. Other syntheses proposed have involved the reaction of other hydrocarbons with sulfur or hydrogen sulfide in the presence of various catalytic materials. Thiophene has been produced also from butyl mercaptan by dehydrogenation and cyclization, by cyclization of organic compounds, by interchange of heteroatoms in heterocyclic compounds, etc. It must be noted, however, that the yields of thiophene in all of these syntheses generally, have been poor, in some cases, only traces of thiophene or derivatives thereof being produced.

The inherent chemical character of thiophene indicates a potentially wide use of this compound in industrial applications; however, the costly nature of the methods of separating and recovering thiophene from crude benzene and of synthesizing thiophene, referred to hereinbefore, have somewhat limited the use of this compound commercially, the only present outlets of any consequence, being the drug and dye fields.

Various attempts have been made to provide cheap and commercially feasible processes for producing thiophene; but and as noted hereinbefore, processes embodying the methods known to the prior art, have suffered from two disadvantages, the first being the availability and consequently, the cost of the charging stocks, and the second being the magnitude of the yields of thiophene achieved. Thus and as is well known to those familiar with the art, when the charge stock of a given process has been readily available and its cost, therefore, has been relatively low, the yields of thiophene have been small; on the other hand, when the yields have been high, the cost of the charge stock has been high.

In the search for readily available and cheap charge stocks to synthesize organic compounds generally, butane has been reacted with sulfur. This reaction was carried out to determine what compounds would be formed and not for the express purpose of synthesizing thiophene. However, not more than a mere trace of thiophene was obtained. [Baker and Reid, J. Am. Chem. Soc., vol. 51, p. 1566 (1929).]

We have discovered that thiophene may be produced in substantial amounts, by reacting normal aliphatic hydrocarbons containing four carbon atoms, with sulfur at elevated temperatures and under closely controlled reaction conditions.

Accordingly, it is an object of the present invention to provide a cheap process for producing thiophene. Another object is to provide a cheap and readily available source of thiophene. A further object is to provide a process for producing thiophene that is commercially feasible. A more specific object is to provide a process for obtaining high yields of thiophene from normal aliphatic hydrocarbons containing four carbon atoms. A very important object is to afford a process capable of carrying out the above objects by reacting normal aliphatic hydrocarbons containing four carbon atoms, with sulfur at elevated temperatures and under closely controlled reaction conditions.

Other objects and advantages of the present invention will become apparent to those skilled in the art from the following description taken in conjunction with the following drawings, in which:

Figure 1 shows a curve representing graphically the relationship between the yield per pass of thiophene and the proportion of sulfur in the charge;

Figure 2 shows a curve representing graphically the relationship between the sulfur through-put and the reaction temperature;

Figure 3 shows a curve representing graphically the relationship between the ultimate yield of thiophene in recycle operation, and the reaction temperature;

Figure 4 shows a curve representing graphically the relationship between the yield per pass of thiophene and the reaction temperature; and Figure 5 is a diagrammatic illustration of a plant for practicing the process of our invention.

Broadly stated, our invention provides a process for manufacturing thiophene, which comprises separately preheating sulfur and one or more normal aliphatic hydrocarbons selected from the group consisting of normal butane, normal butenes and butadienes, to temperatures such that combining the sulfur and hydrocarbon material will give a mixture having a temperature in excess of about 850° F., mixing the sulfur and hydrocarbon material, maintaining the temperature of the mixture at temperatures in excess of about 850° F. for a period of time of less than about one second, and reducing the temperature of the mixture to less than about 850° F.

A feature of the process of the present invention is that with the exception of hydrogen sulfide, thiophene is the principal sulfur-containing compound obtained. A tar, probably a mixture of complex hydrocarbon polysulfides, containing about 75% sulfur is also produced. The sulfur in this tar can be recovered and recycled. Mercaptans and carbon disulfide are also formed, but these only in small amounts. The hydrogen sulfide obtained may be regenerated almost quantitatively back to sulfur for use in the process, by an inexpensive treatment, such as incomplete combustion into water and sulfur.

Another feature of the process of the present invention is that the materials in the charge, i. e., normal aliphatic hydrocarbons containing four carbon atoms and sulfur are cheap and plentiful. Generally speaking, the aliphatic hydrocarbons suitable for the process are the normal aliphatic hydrocarbons represented by the molecular formulas $C_4H_{10}$, $C_4H_8$ and $C_4H_6$. These aliphatic hydrocarbons may be derived from any suitable source, as is well known in the art, and may consist either of normal butane or normal butenes or even butadienes or mixtures of them. It should be observed, however, that for economical operation of our process, butadienes per se cannot be processed successfully because of the tendency of butadienes to polymerize under the conditions of the process. A conventional source of normal butane and normal butenes is the fixed gases obtained around petroleum refineries. These fixed gases may furnish substantially all the desired aliphatic hydrocarbons, or it may be necessary or desirable to obtain additional supplies, as is well understood. It must be noted that normal butane, an unreactive constituent of by-product refinery gases and of natural gas, which is used largely for its fuel value only, may be processed into thiophene, in accordance with our invention, to give a valuable product which heretofore has been unavailable to industry because of its high cost.

An important feature of our invention is that in our process the reaction is highly selective. High yields of thiophene are obtained, and it may be recovered from the reaction product in a highly pure state using conventional and readily available fractionating equipment.

A very important feature of the present invention is that it provides a cheap and efficient method of producing thiophene. In our process, no catalysts are employed, thereby avoiding the disadvantages attendant on their use, such as regeneration and replacement problems, as well as the use of special reaction chambers. The process is substantially a one-step process, although as will subsequently be seen, appreciable amounts of butenes and butadienes may be found in the effluent from the reaction zone. These may be recycled to the reaction zone for further conversion into thiophene, thereby increasing the overall yield of the desired product. The equipment required is essentially only a pair of corrosion-resistant alloy preheaters, a corrosion-resistant alloy reactor coil and a corrosion-resistant condensing system. The separation of hydrogen sulfide presents few difficulties, since most of it can be removed by suitable stabilizing equipment and the last traces removed by caustic scrubbing or other conventional hydrogen sulfide removal processes.

While relatively large quantities of sulfur are employed, it is nevertheless one of the cheapest and most non-critical chemical reagents. We have found, in the operation of our process, and as shown in Figure 1, that the relative proportions of sulfur and hydrocarbon material in the charge, may be varied over wide limits. However, too much sulfur results in poor efficiency in sulfur utilization per pass and favors the complete oxidation of hydrocarbon material to carbon disulfide. On the other hand, too low a proportion of sulfur lowers the conversion per pass and the ultimate yield by increasing the overall thermal degradation of hydrocarbon material. Generally speaking, best results are obtained using a weight ratio of sulfur to hydrocarbon material varying between about 0.5 and about 4.0, although when butenes or butadienes constitute the bulk of the hydrocarbon material in the charge, the lower limit of the weight ratio may be lower than 0.5.

The selectivity of the reaction involved in the process of the present invention depends primarily upon two variables, namely, reaction temperature at which the normal aliphatic hydrocarbon or hydrocarbons containing four carbon atoms are contacted with sulfur, and reaction time or the time during which contact between the reactants is maintained at the reaction temperature.

The limits of operating temperature are fixed by the kinetics of the desired reaction and the kinetics of possible side reactions. We have found that the reaction temperature may vary between about 850° F. and about 1400° F., and preferably, between about 1100° F. and about 1300° F. Below the lower limit of the temperature range, as shown in Figures 2 and 3, the reaction is so slow as to require a large throughput of sulfur and a higher ratio of hydrocarbon recycle for a fixed amount of end product, therefore detracting from the economics of the operation. Further, the secondary reaction of tar formation consumes a larger proportion of the charge. Above the upper limit of the temperature range, as shown in Figures 3 and 4, the secondary reaction of degradation of hydrocarbon material in the charge takes precedence, thereby decreasing the yield of desired product. It must be noted also, that at these high temperatures, corrosion problems are at a maximum, corrosion increasing perceptibly with increasing temperature.

As expected, we have found that the optimum reaction time depends upon the temperature employed. Generally speaking, other variables remaining constant, the lower the temperature, the longer the reaction time. The reaction or contact time and the reaction temperature are somewhat fixed, one in relation to the other, by the degree of degradation of the hydrocarbon material in the charge, and by the extent of formation of undesirable products, which may be tolerated. Thus, too long a contact time at high temperatures, results in severe cracking of the hydrocarbon material in the charge. The reaction proceeds with extreme speed, the only limitation apparently being the rapidity with which heat can be supplied to the reaction mixture. The reaction is highly endothermic, requiring by experimental measurement, approximately 28,000 calories per gram molecular weight of thiophene produced from normal butane. The lower limit of the range of reaction time is fixed, therefore, by the engineering problem of heat transfer and by mechanical limitations, such as allowable pressure drop across the reactor. Too long a reaction time at temperatures in the neighborhood of the lower limit of the temperature range, results in lower overall yields of thiophene due to increased formation of heavy tar. On the other hand, too short a reaction time at temperatures in the neighborhood of the lower limit of the temperature range, results in insufficient reaction. In view of the foregoing, the criteria to be used in determining optimum operating temperatures and reaction times are to choose the degree of conversion desired commensurate with operating costs such as heat input and equipment costs, bearing in mind that the shorter the reaction time and concordantly, the higher the temperature, the larger the amount of end product which can be realized from a unit of given size per day. We have found that the optimum reaction time for the temperature range used in our process, about 850° F. to about 1400° F., varies between about 1.0 second and about 0.01 second.

The necessity for closely controlled reaction time at the selected reaction temperature renders the separate preheating of the reactants essential. Heating the hydrocarbon material and the sulfur together has two undesirable effects. In the first place, at lower temperatures, the reaction producing tar formation is the favored reaction; and in the second place, these heavy products are subsequently cracked in the reactor at the selected reaction temperature, causing undue coking. Tests have shown that when the reactants are heated together up to temperatures within the aforementioned reaction temperature range, tar formation always results, and in such quantities, that the reaction zone is eventually plugged up with a heavy, carbonaceous deposit. Accordingly, it is essential in our process to separately preheat each of the reactants, i. e., the hydrocarbon or the mixture of hydrocarbons constituting the hydrocarbon reactant, and sulfur, to such temperatures that when they are brought together, under proper conditions of flow, a temperature falling within the reaction temperature range is achieved, before effecting contact between them. In practice, this is effected ordinarily, by separately preheating each of the reactants to temperatures within the reaction temperature range.

As stated hereinbefore, we have found, for economical operation of the process, that butadiene alone cannot be used as the hydrocarbon reactant because of its tendency to polymerize in the preheater with consequent cracking and severe coking in the reactor. However, when butadiene is used in conjunction with butane and/or butenes, or with suitable diluents which are inert with respect to sulfur and to other reaction products of the process, for example, nitrogen, carbon disulfide, carbon dioxide, etc., it can be processed satisfactorily to give high yields of thiophene. For effective operation of our process, we have found that butadienes should not constitute more than about 30% by volume of the hydrocarbon material in the charge.

In our process, the reaction is effected, preferably, at atmospheric pressure or under sufficient pressure to cause the flow of the reactants through the reactor and auxiliary system, under the desired reaction conditions. We have found that best results are obtained when turbulent flow is maintained through the reactor, suitably, a conventional coil-type pipe reactor. With this type of reactor, the desired turbulent flow may be achieved with a pressure drop of about 2 to 20 pounds across the coil, depending upon the size of the pipe and the length of the coil. Turbulent flow promotes heat transfer and assures good mixing of the reacting vapors of sulfur and hydrocarbon material.

After the preheated hydrocarbon reactant and sulfur are mixed and allowed to react for the specified reaction time, the temperature of the reaction mixture is immediately lowered to below about 850° F. in order to avoid over-reaction in the system after leaving the reactor. This may be achieved suitably by spraying the effluent of the reactor with a liquid.

Recycling of the unreacted portion of hydrocarbon material in the effluent stream has been found to be a desirable scheme for increasing the ultimate yield of thiophene. This has the same effect as lengthening the reaction time without the attendant and undesirable degradation of hydrocarbon material, referred to hereinbefore. When butane is the hydrocarbon reactant, it is suspected that the reaction proceeds stepwise with the formation of the corresponding olefinic hydrocarbon, diolefinic hydrocarbon, and finally thiophene, each step causing the formation, simultaneously, of hydrogen sulfide, molecular weight for molecular weight. These reactions occur concurrently and unreacted butane as well as butenes and butadienes are found in the effluent. Only traces of acetylenic hydrocarbons have been found. These hydrocarbons in the effluent serve as recycle stream in the recycling operation. In this connection, it must be observed that when butenes are the sole constituents of the hydrocarbon reactant, recycling of the hydrocarbons in the effluent is not commercially feasible in view of the high concentration of butadienes in the recycle stock. However, and as stated hereinbefore, butane or other suitable diluents may be added to the recycle stock and the latter processed to give high yields of thiophene.

Accordingly, a most important feature of our process is that it is flexible, it being possible to produce butenes as well as butadienes from butane, or butadienes from butenes, in addition to thiophene.

A plant for practicing the process of our invention is illustrated diagrammatically in Figure 5. It is understood of course, that certain modifications of this operating scheme, as well as changes in the type of equipment employed, may be made as long as the essential requirements of the process are maintained, as will be obvious to those skilled in the art, once the conditions of the process, with which this invention is concerned, are clearly understood.

Referring now more particularly to Figure 5, normal butane is pumped from a storage sphere 4 by a pump 5, to a preheater coil 6. Molten sulfur is pumped from a storage tank 1 by a pump 2, to a preheater coil 3. The preheated vapors of butane and sulfur are mixed at a point 7 prior to introduction into the reactor, and are then sent through a reactor coil 8. The preheaters 3 and 6 and the reactor 8 may each be in separate furnaces if desired, or, if in the same furnace, as shown, may be of different lengths to produce the desired preheating temperatures and reaction temperatures. As stated hereinbefore, one very essential factor of the process is that short reaction times must be used. This requires rapid mixing of the reactant and rapid heat transfer to the reaction mixture. The reaction products enter a spray chamber 9 where they are quenched to a temperature of about 300° F., by spraying suitably with crude thiophene or some other liquid product of the process. The quenched reaction products subsequently are passed into a tar-separator 10, wherein tar separates out and is sent to a sulfur-recovery plant 19. The reaction products free of the bulk of the tar, go to a filter 11, to separate the tar mist. A Cottrell precipitator may be used as the mist collector if desired. The filtered products are then passed into a condensate stripper column 12 where most of the products that are normally liquid are stripped out. This column may be operated as an absorption stripper by using thiophene bottoms as the absorber liquid. The liquid bottoms from the condensate stripper column 12, go to a carbon disulfide tower 17 and the overhead to a compressor 13 and thence to a column 14 where $C_3$-hydrocarbon gases, gases lighter than $C_3$-hydrocarbons and hydrogen sulfide are removed as overhead and sent to the sulfur-recovery plant 19. The bottoms from the column 14, consisting of $C_4$-hydrocarbons and materials having boiling points higher than $C_4$-hydrocarbons, are passed into a column 15 where $C_4$-hydrocarbons are obtained as overhead and recirculated through a meter 16 to the preheater 6, and thus returned to the process as recycle stock. The bottoms from the column 15 are combined with the bottoms from the condensate stripper column 12, and sent to the carbon disulfide tower 17. Carbon disulfide is taken off as overhead from the tower 17 and sent to storage, while the bottoms from the tower 17 are passed into a thiophene tower 18 where thiophene is taken as overhead and to storage and thiophene bottoms taken to storage to be used in the condensate stripper column 12 and/or as a quenching medium.

In a typical operation, the hydrocarbon material charged to the preheater coil 6 is made up of a rough butane cut containing varying amounts of butenes, obtained from a cracking unit for the conversion of gas oil into gasoline. Sulfur is charged to the preheater 3, in amounts to produce a mixture at 7 having a weight ratio of sulfur to butane cut, of about 1.0 and the charge rates are adjusted to give a reaction time of about 0.05 seconds in the reactor coil 8 at temperatures of 1200° F.

The following detailed examples are for the purpose of illustrating modes of producing thiophene in accordance with our invention, it being clearly understood that the invention is not to be considered as limited to the specific manipulations and conditions set forth hereinafter.

*Example 1*

A mixture containing 30% by volume of 1,3-butadiene and 70% by volume of normal butane was charged into a preheater at the rate of 35 grams per minute and heated to a temperature of 1100° F. Sulfur was charged to a separate preheater at a rate of 28 grams per minute and heated to a temperature of 1100° F. The two streams were sent through a mixing nozzle and thence through a baffled tube reactor of 50 c. c. volume constructed of 27% chromium stainless steel maintained at a temperature of 1300° F. The reaction product was quenched with a water spray, passed through a small Cottrell precipitator to remove tar mist, and scrubbed through a hot counter-current caustic tower. Liquid product was condensed and separated in a water cooler and ice trap and the residual gas metered. 49% of the hydrocarbon material charged went to liquid product and tar. Fractionation of a portion of the stabilized (i.e., after removal of $C_4$-hydrocarbons and lighter constituents) liquid showed the following composition:

| | Percent |
|---|---|
| Carbon disulfide | 9.0 |
| Thiophene | 80.5 |
| Residue (mostly thiophene) | 10.5 |

*Example 2*

4959 grams of technical butene-2 (0.9% isobutylene, 98.5% butene-2 and 0.6% normal butane, by Podbielniak distillation), were charged at the rate of 49 grams per minute to a preheater coil consisting of 20 feet of 0.15 inch internal diameter 18–8 stainless steel tubing, immersed in a lead bath kept at 1190° F., and preheated to a temperature of 1160° F. 7230 grams of molten sulfur were charged at the rate of 71.7 grams per minute to a preheater coil consisting of 20 feet of ⅛-inch iron pipe size 27% chromium stainless steel tubing, immersed in a lead bath kept at a temperature of 1320° F., and preheated to a temperature of 1290° F. The preheated reactants were then sent through a mixing nozzle and then through a reactor consisting of 12 feet of ⅛-inch iron pipe size 27% chromium stainless steel tubing immersed in a lead bath kept at a temperature of 1260° F., to give a temperature at the entrance to the quench tower of 1250° F. The pressure drop across the reactor was 12 pounds per square inch gauge, and the reaction time was 0.03 second. The reaction product was quenched with a water spray, sent through water-cooled heat exchangers to a tar trap, and thence to a glass-wool filter where the tar mist was filtered out. The filtered gas was subsequently sent through a counter-current caustic scrubber maintained at a temperature of 176° F. for the removal of hydrogen sulfide. The remaining reaction product stream was sent through an efficient cooling system and finally to an ice trap for collecting the crude thiophene. The off-gases from the ice trap were metered and subjected to Podbielniak distillation with the following results:

| | Mole percent |
|---|---|
| Hydrogen sulfide | 0.4 |
| Methane | 3.4 |
| $C_2$-hydrocarbons | 2.7 |
| $C_3$-hydrocarbons | 6.3 |
| Butenes | 49.6 |
| Butadiene | 35.2 |
| Butane | 1.0 |
| Residue | 1.4 |

The following products were obtained:

| | Grams |
|---|---|
| Hydrogen sulfide | 3,982 |
| Liquid product | 3,340 |
| Off-gases | 1,610 |
| Tar | 3,020 |

The liquid product was fractionated on a 15-plate column with the following results:

| | Percent by weight |
|---|---|
| $C_4$-hydrocarbons | 17.1 |
| Carbon disulfide | 8.9 |
| Thiophene | 71.5 |
| Residue | 2.5 |

*Example 3*

The run described in Example 2 was repeated with the exception that 4,870 grams of normal butane (containing 93 mole percent of normal butane and 6 mole percent isobutane) were charged at a rate of 31 grams per minute, to the hydrocarbon preheater, simultaneously with 4,370 grams of a recycle stream charged at a rate of 28.6 grams per minute. The recycle stream was obtained by compressing the off-gases obtained in the ice trap of Example 2; the compressed gases passing through a water-cooled heat-exchanger and thence, to a liquid hydrocarbon reservoir. The pressure in the hydrocarbon reservoir was maintained at 80 pounds per square inch gauge by bleeding off the proper amount of light gases resulting from thermal cracking. The recycle stream sent to the hydrocarbon preheater had the following composition:

| | Mole percent |
|---|---|
| Hydrogen sulfide | 1.0 |
| Methane | 1.0 |
| $C_2$-hydrocarbons | 4.2 |
| $C_3$-hydrocarbons | 8.0 |
| Butenes | 14.2 |
| Butadiene | 23.3 |
| Butane | 47.2 |
| Residue | 1.0 |

In this run, 9,860 grams of sulfur were charged to the sulfur preheater at a rate of 64.4 grams per minute. The pressure drop across the reactor was 8 pounds per square inch guage, and the reaction time was 0.04 second.

The following results were obtained.

| | | Grams |
|---|---|---|
| "Light" gases | | 1,073 |
| | Mole percent | |
| Hydrogen sulfide | 1.0 | |
| Methane | 36.6 | |
| $C_2$-hydrocarbons | 16.1 | |
| $C_3$-hydrocarbons | 5.0 | |
| Butadiene | 13.0 | |
| Butenes | 12.2 | |
| Butane | 15.6 | |
| Residue | 0.6 | |
| Hydrogen sulfide | | 7,320 |
| Tar | | 2,645 |
| | Percent by weight | |
| Carbon | 25.2 | |
| Hydrogen | 1.8 | |
| Sulfur | 73.0 | |
| Crude thiophene | | 3,456 |
| | Percent by weight | |
| $C_4$-hydrocarbons | 15.4 | |
| Carbon disulfide | 10.2 | |
| Thiophene | 72.4 | |
| Bottoms | 2.0 | |

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

We claim:

1. A process for producing thiophene, which comprises separately preheating sulfur and hydrocarbon material selected from the group consisting of normal butane, normal butenes and butadienes, to temperatures such that combining said sulfur and said hydrocarbon material will give a reaction mixture having a temperature varying between 850° F. and about 1400° F., mixing the preheated sulfur and the preheated hydrocarbon material, reacting said preheated sulfur with said preheated hydrocarbon material at temperatures varying between 850° F. and about 1400° F. for a period of time of not more than about one second to yield a thiophene-containing mixture, and reducing the temperature of said thiophene-containing mixture to less than 850° F.

2. A process for producing thiophene, which comprises separately preheating sulfur and hydrocarbon material selected from the group consisting of normal butane, normal butenes and butadienes, to temperatures varying between about 1100° F. and about 1300° F., mixing the preheated sulfur and the preheated hydrocarbon material, reacting said preheated sulfur with said preheated hydrocarbon material at temperatures varying between about 1100° F. and about 1300° F. for a period of time varying between about 0.01 second and about one second to yield a thiophene-containing mixture, and reducing the temperature of said thiophene-containing mixture to less than about 850° F.

3. A process for producing thiophene, which comprises separately preheating sulfur and a mixture of normal butane, normal butenes and butadienes, said butadienes constituting less than about 30% by volume of said mixture, to temperatures such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a thiophene-containing mixture, and reducing the temperature of said thiophene-containing mixture to less than 850° F.

4. A process for producing thiophene, which comprises separately preheating sulfur and a mixture of normal butane, normal butenes and butadienes, said butadienes constituting less than about 30% by volume of said mixture, to temperatures varying between about 1100° F. and about 1300° F., mixing the preheated sulfur and the preheated mixture, reacting said preheated sulfur with said preheated mixture at temperatures varying between about 1100° F. and about 1300° F. for a period of time varying between about 0.01 second and about one second to yield a thiophene-containing mixture, and reducing the temperature of said thiophene-containing mixture to less than about 850° F.

5. A process for producing thiophene, which comprises separately preheating sulfur and a mixture of normal butane and normal butenes, to temperatures such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a product containing thiophene, normal butane, normal butenes and butadienes, reducing the temperature of said product to less than 850° F., separating normal butane, normal butenes and butadienes from said product, and recycling said normal butane, normal butenes and butadienes to the process.

6. A process for producing thiophene, which comprises separately preheating sulfur and a mixture of normal butane and butadienes, said butadienes constituting less than about 30% by volume of said mixture, such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a product containing thiophene, normal butane, normal butenes and butadienes, reducing the temperature of said thiophene-containing product to less than 850° F., separating normal butane, normal butenes and butadienes from said product, and recycling said normal butane, normal butenes and butadienes to the process.

7. A process for producing thiophene, which comprises separately preheating sulfur and a mixture of normal butane and butadienes, said butadienes constituting less than about 30% by volume of said mixture, to temperatures such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a thiophene-containing mixture, and reducing the temperature of said thiophene-containing mixture to less than 850° F.

8. A process for producing thiophene, which comprises separately preheating sulfur and a mixture of normal butane and butadienes, said butadienes constituting less than about 30% by volume of said mixture, to temperatures varying between about 1100° F. and about 1300° F., mixing the preheated sulfur and the preheated mixture, reacting said preheated sulfur with said preheated mixture at temperatures varying between about 1100° F. and about 1300° F. for a period of time varying between about 0.01 second and about one second to yield a thiophene-containing mixture, and reducing the temperature of said thiophene-containing mixture to less than about 850° F.

9. A process for producing thiophene, which comprises separately preheating sulfur and a mixture of normal butenes and butadienes, said butadienes constituting less than about 30% by volume of said mixture, to temperatures such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a thiophene-containing mixture, and reducing the temperature of said thiophene-containing mixture to less than 850° F.

10. A process for producing thiophene, which comprises separately preheating sulfur and a mixture of normal butenes and butadienes, said butadienes constituting less than about 30% by volume of said hydrocarbon mixture, to temperatures varying between about 1100° F. and about 1300° F., mixing the preheated sulfur and the preheated mixture, reacting said preheated sulfur with said preheated mixture at temperatures varying between about 1100° F. and about 1300° F. for a period of time varying between about 0.01 second and about one second to yield a thiophene-containing mixture, and reducing the temperature of said thiophene-containing mixture to less than about 850° F.

11. A process for producing thiophene, which comprises separately preheating sulfur and normal butane to temperatures such that combining said sulfur and said normal butane will give a reaction mixture having a temperature varying between 850° F. and about 1400° F., mixing the preheated sulfur and the preheated normal butane, reacting said preheated sulfur with said preheated normal butane at temperatures varying between 850° F. and about 1400° F. for a period of time of not more than about one second to yield a thiophene-containing mixture, and reducing the temperature of said thiophene-containing mixture to less than 850° F.

12. A process for producing thiophene, which comprises separately preheating sulfur and normal butane to temperatures varying between about 1100° F. and about 1300° F., mixing the preheated sulfur and the preheated normal butane in a proportion of one part by weight of normal butane to about 0.5 to about 4 parts by weight of sulphur, reacting said preheated sulfur with said preheated normal butane at temperatures varying between about 1100° F. and about 1300° F. for a period of time varying between about 0.01 second and about one second to yield a thiophene-containing mixture, and reducing the temperature of said thiophene-containing mixture to less than about 850° F.

13. A process for producing thiophene, which comprises separately preheating sulfur and normal butenes to temperatures such that combining said sulfur and said normal butenes will give a reaction mixture having a temperature varying between 850° F. and about 1400° F., mixing the preheated sulfur and the preheated normal butenes, reacting said preheated sulfur with said preheated normal butenes at temperatures varying between 850° F. and about 1400° F. for a period of time of not more than about one second to yield a thiophene-containing mixture, and reducing the temperature of said thiophene-containing mixture to less than 850° F.

14. A process for producing thiophene, which comprises separately preheating sulfur and normal butenes to temperatures varying between about 1100° F. and about 1300° F., mixing the preheated sulfur and the preheated normal butenes, reacting said preheated sulfur with said preheated normal butenes at temperatures varying between about 1100° F. and about 1300° F. for a period of time varying between about 0.01 second and about one second to yield a thiophene-containing mixture, and reducing the temperature of said thiophene-containing mixture to less than about 850° F.

15. A process for producing thiophene, which comprises separately preheating sulfur and a mixture of butadienes and a diluent which is inert with respect to sulfur and to products of the process, said butadienes constituting less than about 30% by volume of said mixture, to temperatures such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a thiophene-containing mixture, and reducing the temperature of said thiophene-containing mixture to less than 850° F.

16. A process for producing thiophene, which comprises separately preheating sulfur and a mixture of butadienes and a diluent which is inert with respect to sulfur and to products of the process, said butadienes constituting less than about 30% by volume of said mixture, to temperatures varying between about 1100° F. and about 1300° F., mixing the preheated sulfur and the preheated mixture, reacting said preheated sulfur with said preheated mixture at temperatures varying between about 1100° F. and about 1300° F. for a period of time varying between about 0.01 second and about one second to yield a thiophene-containing mixture, and reducing the temperature of said thiophene-containing mixture to less than about 850° F.

17. A process for producing thiophene, which comprises separately preheating sulfur and a mixture of normal butane and normal butenes, to temperatures such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a thiophene-containing mixture, and reducing the temperature of said thiophene-containing mixture to less than 850° F.

18. A process for producing thiophene, which comprises separately preheating sulfur and a mixture of normal butane and normal butenes, to temperatures varying between about 1100° F. and about 1300° F., mixing the preheated sulfur and the preheated mixture, reacting said preheated sulfur with said preheated mixture at temperatures varying between about 1100° F. and about 1300° F. for a period of time varying between about 0.01 second and about one second to yield a thiophene-containing mixture, and reducing the temperature of said thiophene-containing mixture to less than about 850° F.

19. A process for producing thiophene, which comprises separately preheating sulfur and a mixture of normal butane, normal butenes, and butadienes, said butadienes constituting less than about 30% by volume of said mixture, to temperatures such that combining said sulfur and said mixture will give a reaction mixture having a temperature varying between 850° F. and about 1400° F., mixing the preheated sulfur and the preheated mixture, reacting said preheated sulfur with said preheated mixture at temperatures varying between 850° F. and about 1400° F. for a period of time of not more than about one second to yield a product containing thiophene, normal butane, normal butenes and butadienes, reducing the temperature of said product to less than 850° F., separating normal butane, normal butenes and butadienes from said product, and recycling said normal butane, normal butenes and butadienes to the process.

20. A process for producing thiophene, which comprises separately preheating sulfur and normal butane to temperatures such that combining said sulfur and said normal butane will give a mixture having a temperature varying between 850° F. and about 1400° F., mixing the preheated sulfur and the preheated normal butane, reacting said preheated sulfur with said preheated normal butane at temperatures varying between 850° F. and about 1400° F. for a period of time of not more than about one second to yield a product containing thiophene, normal butane, normal butenes and butadienes, reducing the temperature of said product to less than 850° F., separating normal butane, normal butenes and butadienes from said product, and recycling said normal butane, normal butenes and butadienes to the process.

ROWLAND C. HANSFORD.
HERBERT E. RASMUSSEN.
CLAUDE G. MYERS.
ALEXANDER N. SACHANEN.

REFERENCES CITED

The following references are of record in the file of this patent:

UNITED STATES PATENTS

| Number | Name | Date |
|---|---|---|
| 2,369,377 | Thacker | Dec. 13, 1945 |
| 2,410,401 | Coffman | Oct. 29, 1946 |

OTHER REFERENCES

Shepard, J. Am. Chem. Soc. 56, 1355–6 (1934).